Figure 5:
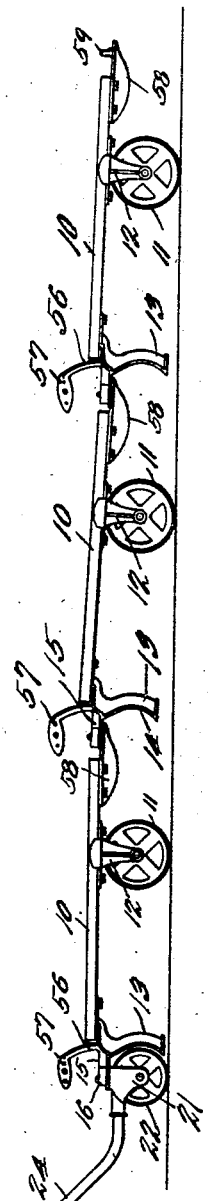

G. G. & E. L. HOWE & R. J. TEETOR.
TRUCK.
APPLICATION FILED JAN. 25, 1917.
1,234,667.
Patented July 24, 1917.
3 SHEETS—SHEET 1.
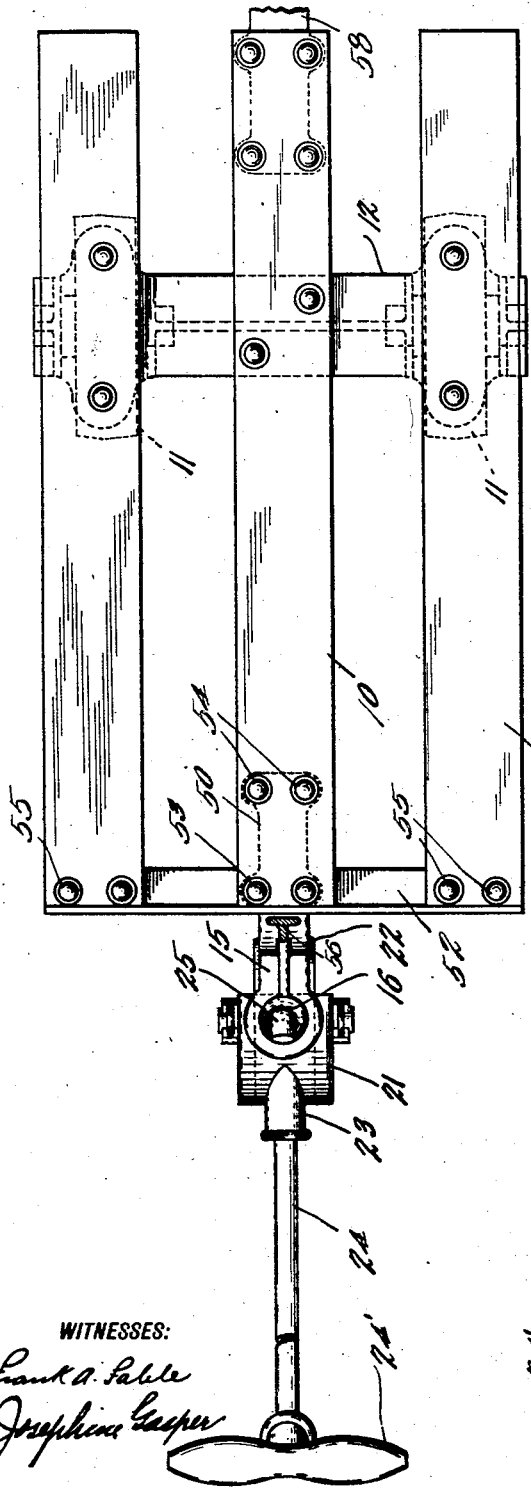
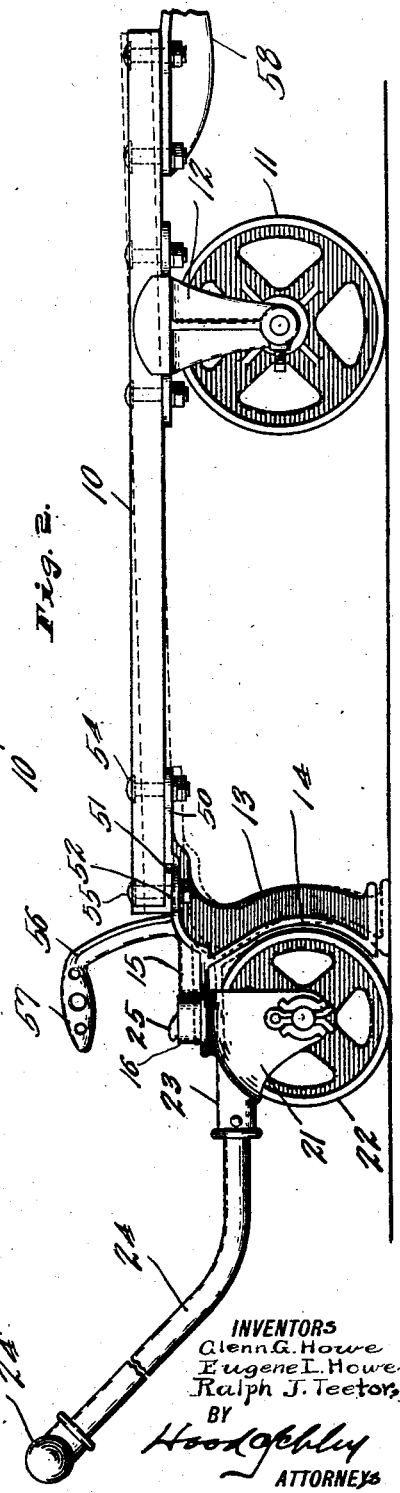
WITNESSES:
INVENTORS
Glenn G. Howe
Eugene L. Howe
Ralph J. Teetor,
BY
ATTORNEYS

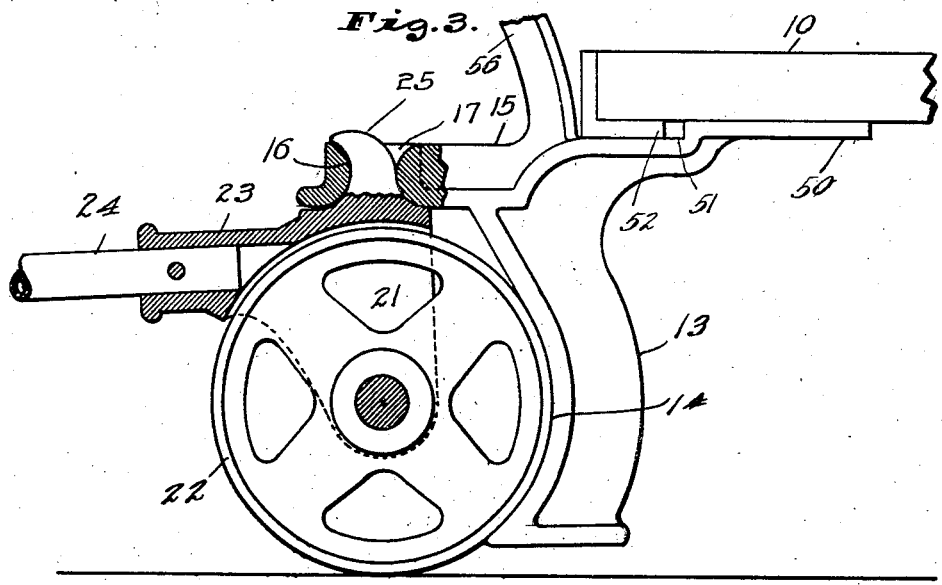
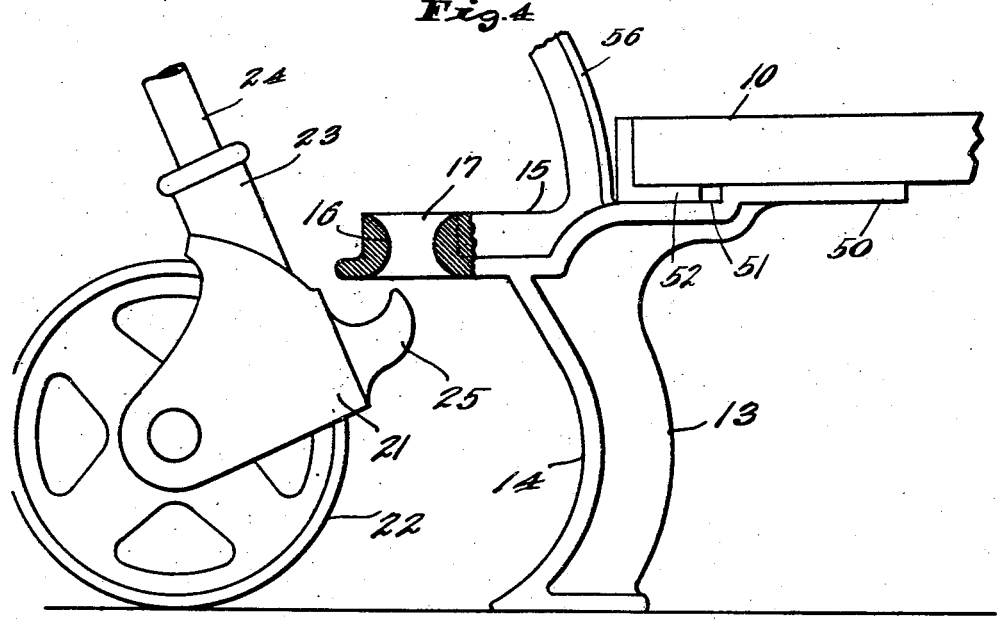

G. G. & E. L. HOWE & R. J. TEETOR.
TRUCK.
APPLICATION FILED JAN. 25, 1917.

1,234,667.

Patented July 24, 1917.
3 SHEETS—SHEET 3.

WITNESSES:
Frank A. Fahle
Josephine Casper

INVENTORS
Glenn G. Howe
Eugene L. Howe,
Ralph J. Teetor.
BY
Hood & Schley
ATTORNEYS

UNITED STATES PATENT OFFICE.

GLENN G. HOWE, EUGENE L. HOWE, AND RALPH J. TEETOR, OF MUSKEGON, MICHIGAN.

TRUCK.

1,234,667.  Specification of Letters Patent.  Patented July 24, 1917.

Application filed January 25, 1917. Serial No. 144,376.

*To all whom it may concern:*

Be it known that we, GLENN G. HOWE, EUGENE L. HOWE, and RALPH J. TEETOR, citizens of the United States, residing at Muskegon, in the county of Muskegon and State of Michigan, have invented a new and useful Truck, of which the following is a specification.

The object of our invention is to produce a truck having a readily separable guide wheel and handle forming a jack truck, of such form that a single guide wheel and handle may be utilized for the transportation of successive trucks, which trucks, when separated from the transportation wheel and handle, will be in stable condition; the details of construction being such that ordinary obstructions due to unevenness in the surfaces over which transportation takes place will not interfere with transportation. Provision is also made whereby the main body of the truck may be readily handled without using the jack truck, and whereby a series of main bodies may be connected together in a train with a single jack truck for the front one. A further object of our invention is to so construct and connect the parts that a very rigid structure may be produced even by the use of longitudinal slats for the platform of the main body.

The accompanying drawings illustrate our invention. Figure 1 is a plan of our improved truck; Fig. 2 a side elevation; Fig. 3 a side elevation, in partial vertical section, of the removable jack truck and adjacent body bracket, with the jack truck in supporting and braking position; Fig. 4 a somewhat similar view, showing the jack truck separated from the main body bracket; and Fig. 5 a side elevation of a train of our improved trucks.

In the drawings, 10 indicates the main body on which the load is to be carried, said body being supported by suitable carrying wheels 11, 11, journaled in a rear truck 12, to which the body 10 is attached. At the middle of the end of body 10, opposite wheels 11, we provide a single supporting leg 13, which, at its forward face, is provided with an arc-shaped surface 14, the purpose of which will appear. Extending forwardly from leg 13 near its upper end is an arm 15 which is provided near its end with an eye 16 which is preferably rounded out, top and bottom, as indicated at 17, 17.

The leg 13 is provided at its upper end with a rearwardly projecting arm 50 having a transverse depression 51 adapted to receive the horizontal arm of a transversely arranged angle iron 52, said horizontal arm projecting rearwardly from the vertical arm. The angle iron 52 is attached to arm 50 by means of bolts 53 which may also pass through the platform, or platform bar, 10, other bolts 54 being also provided for attaching the arm 50 to the platform, or platform bar, 10. Other bolts 55 pass through the horizontal arm of angle iron 52 and through other platform bars 10. It is decidedly advantageous to have the rear truck 12 a single solid substantial structure, so that, when connected to the angle bar 52, by bars 10, a rigid substantial truck is produced.

The jack truck which is designed to coöperate with the structure thus far described, comprises a main bifurcated body 21 between the legs of which is journaled a caster wheel 22. Body 21 is provided with a socket 23 which receives a handle bar 24. At its top is an upwardly and forwardly projecting pin 25 which is circular in horizontal section at its middle and uniformly flared outwardly at its base so as to fit, with a slight play, the lower end of the perforation 16, the arrangement being such that the finger 25 may be hooked upwardly into the perforation 16 and the wheel 22, if desired, thrown back into frictional contact with face 14 of leg 13, the leg end of the main truck being raised, to the positions shown in Figs. 2 and 3, as the wheel 22 passes beneath the arm 15.

The cross bar 24' of the handle bar 24 lies considerably above arm 15 preferably, and consequently, when either a push or pull is exerted upon this cross bar, under normal conditions, the line of action will be above the pin 25 if it be a push and below the pin if it be a pull, so that in either case, any force acting to transport the structure will first draw wheel 22 away from face 14 so as to eliminate the braking action. As soon, however, as the handle bar is dropped, its weight will serve to drive wheel 22 back against face 14 and thus automatically brake the structure against movement.

The jack truck may be readily withdrawn by an upward swinging of the handle bar and a subsequent forward movement of the wheel 22, as indicated in Fig. 4, the leg 13 being thus lowered to the floor where it will support the load-carrying body in a fixed position.

We deem it especially important that the leg 13 is arranged immediately to the rear of the wheel 22, because, in using the structure on uneven surfaces, the lower end of the leg is so close to the jack truck wheel that any obstructions which will be passed over by this wheel will be of such character as to be also passed over by the leg and, of course, any obstructions which are not engaged by the jack truck wheel, will also be avoided by the leg. In order to facilitate the handling of the main truck readily when empty, we have found it convenient to provide leg 13 with an upwardly and forwardly extending arm 56, provided with a forwardly extending handle 57 at its upper end. We also find it very desirable to provide each main truck, at its rear end, with a rearwardly extending bracket 58, provided at its end with an upwardly extending pin 59, adapted to receive any one of the eyes 16 so that several of the main trucks may be connected together, as shown in Fig. 5. The bracket 58 should preferably be so formed as to require slight elevation of the front end of the truck, beyond what is required when coacting with the jack truck, in order that the leg 13 may be lifted far enough from the floor to insure passage over possible obstructions.

Arm 15 is projected forwardly far enough in front of the end of the load-carrying platform so that the jack truck may be brought into association with said arm at any position through an angle of considerably more than 180° swing around a vertical axis. By this arrangement, the trucks may be arranged end to end in very close sequence, and yet be readily withdrawable from the row by the use of a jack truck, said jack truck being easily run into place, with handle 24 lying substantially at right angles to the general line of the truck and brought into correlation with the eye 17 of the desired truck.

We claim as our invention:

1. The combination of a load-carrying platform, wheeled supports at one end, and a medial leg at the other end, a jack-truck-receiving member associated with said leg, and a jack truck provided with a member for separable swiveled connection with said jack-truck-receiving member, substantially as described, said connection permitting the wheel of the jack-truck to frictionally engage the leg.

2. The combination of a load-carrying platform, wheeled supports at one end, and a medial leg at the other end, a jack-truck-receiving member associated with said leg, and a jack truck provided with a member for separable swiveled connection with said jack-truck-receiving member, substantially as described.

3. A load-carrying truck comprising a main body, a wheeled support at one end, a downwardly extending leg at the other end, and one part of a swivel-connection carried by said leg, said swivel part being formed to receive a jack-truck, and the forward face of the leg being formed for frictional engagement by a wheel of such jack-truck.

4. A load-carrying truck comprising a main body, a wheeled support at one end, a single downwardly extending leg at the other end, and one part of a swivel-connection carried by said leg, said swivel part being formed to receive a jack-truck.

5. A load-carrying truck comprising a main body, a wheeled support at one end, a downwardly extending leg at the other end, and one part of a swivel connection arranged immediately in front of said leg, said swivel part being formed to receive a jack-truck.

6. A load-carrying truck, comprising a main body, a wheeled support at its rear end, a central supporting leg at its forward end provided with a forwardly extending eye-carrying arm, and a rearwardly extending bracket carried by the rear end of the main body and provided with an upwardly extending pin adapted to receive the eye of another truck.

7. A load-carrying truck comprising a main body, a wheeled support at its rear end, a downwardly extending supporting leg at the front end provided with a forwardly extending eye-carrying arm, and also provided with a handle by means of which the truck may be readily shifted.

8. A load-carrying truck comprising an integral, two-wheel rear truck, a front supporting leg, a transverse angle iron secured to said leg with one of its arms arranged horizontally and extending rearwardly, a platform connecting said rear truck and said angle iron, a forwardly extending eye-carrying arm carried by said leg, and a handle carried by said leg.

9. A load-carrying truck comprising an integral, two-wheel rear truck, a front supporting leg, a transverse angle iron secured to said leg with one of its arms arranged horizontally and extending rearwardly, a platform connecting said rear truck and said angle iron, and a forwardly extending eye-carrying arm carried by said leg.

10. A load-carrying truck comprising an integral, two-wheel rear truck, a front supporting leg, a transverse angle iron secured to said leg with one of its arms arranged horizontally and extending rearwardly, a platform connecting said rear truck and said angle iron, and a handle carried by said leg.

11. A load-carrying truck comprising an integral, two-wheel rear truck, a front supporting leg, a transverse angle iron secured to said leg with one of its arms arranged horizontally and extending rearwardly, and a platform connecting said rear truck and said angle iron.

12. A load-carrying truck comprising a load-carrying platform, a wheeled support at one end, a fixed medial leg at the other, a forwardly-extending arm carried by said last-mentioned end and projecting forward of said leg, and a jack truck, said jack truck and forwardly extending arm having separable swivel-forming portions which may be associated with each other at any position through a considerable horizontal swing of the jack truck.

In witness whereof, we have hereunto set our hands at Muskegon, Michigan, this ninth day of January, A. D. one thousand nine hundred and seventeen.

GLENN G. HOWE.
EUGENE L. HOWE.
RALPH J. TEETOR.